April 8, 1969  R. A. DEIBEL ET AL  3,437,014
FLUID PRESSURE POWER ACTUATOR
Filed Dec. 5, 1966
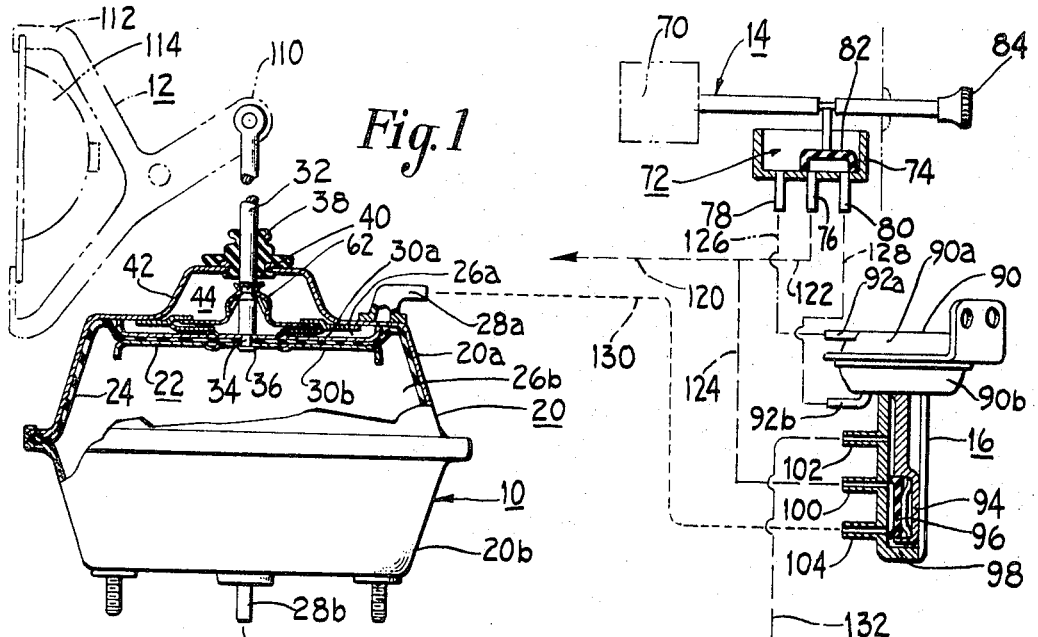
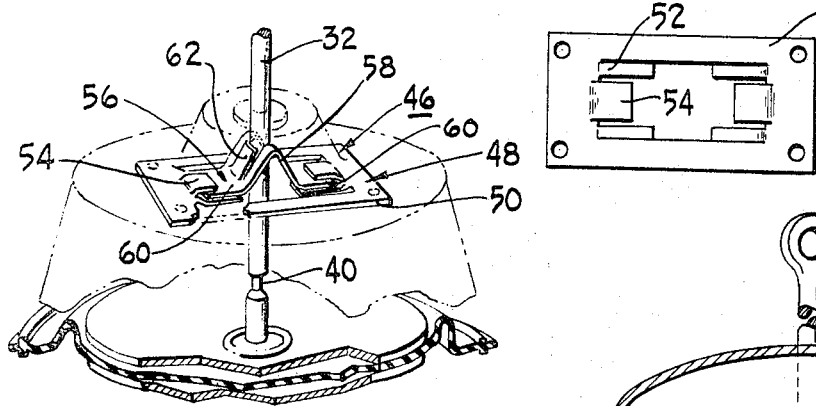
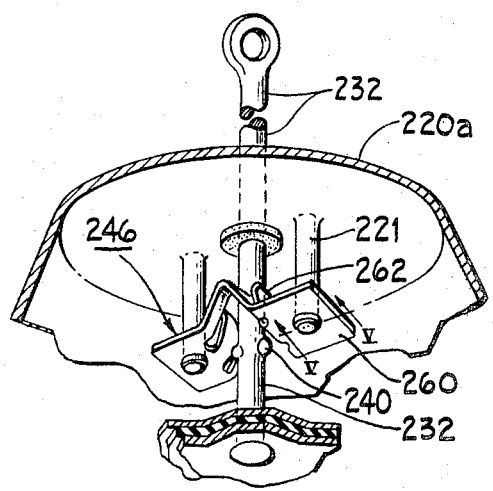
INVENTORS
RAYMOND A. DEIBEL and
JOSEPH J. ANDRYCHA
BY
E. Herbert Liss
ATTORNEY.

United States Patent Office 3,437,014
Patented Apr. 8, 1969

3,437,014
FLUID PRESSURE POWER ACTUATOR
Raymond A. Deibel, Cheektowaga, and Joseph J. Andrycha, Buffalo, N.Y., assignors to Trico Products Corporation, Buffalo, N.Y.
Filed Dec. 5, 1966, Ser. No. 599,035
Int. Cl. F16j *1/00, 3/00;* F01b *19/00*
U.S. Cl. 92—30             5 Claims

ABSTRACT OF THE DISCLOSURE

A pneumatic system for operating retractable headlamps on a motor vehicle which move from a closed position during nonuse to a position exposing the headlamps when lighted. A remotely actuated pneumatic servo valve controls flow of fluid pressure to a differential pressure operated headlamp actuator which is automatically latched in the operative position by a floating latch, thus permitting canting of the actuator shaft.

Background of the invention

The invention relates to improvements in fluid pressure differential actuated power units incorporating an internally integrated automatic latching device. A similar device is disclosed in co-pending application Serial No. 570,903, filed Aug. 8, 1966, by Hobart V. Roberts, Jr., and Joseph J. Andrycha, which utilizes a magnetic latching device. The present invention provides a substantial economy with a means for performing equally dependable latching function of the magnet without the magnet at a considerable saving of cost.

Other devices of this kind have been developed which utilize separate latching elements requiring additional control mechanism systems and/or components for operating the latch. The present invention permits equivalent functioning, is entirely self-contained, is simpler, eliminates a number of parts and connections and is therefore more economical. Since the latching mechanism is fully independent of external control mechanism, perpetual fail-safe operation is attained. The need for fluid conduits, electrical circuits, or mechanical linkage to insure retention of proper headlamp position is entirely eliminated.

Summary

An improved power unit is provided for moving auxiliary equipment, particularly in motor vehicles, from one position to another. For safe operation it is often required that the auxiliary equipment be absolutely maintained in one position or various selected positions. In the disclosed embodiment, for example, it is essential that the headlamps be latched in at least the operative position to assure stability of alignment when the headlamps are being used.

The present invention uses an internally integrated detent type latch with the power unit. It furthermore provides locking in systems where canting movement of the power shaft as well as axial movement occurs. The detent unit of this invention provides for positive retention in operative position regardless of the canting of the operating shaft. This is accomplished by using a floating detent latch.

The detent is mounted at a wall of the power unit housing in such a manner that it can move in a plane parallel to the wall, but is substantially retained against axial movement. Thus, the operating shaft of the power unit can be retained in a given axial position. Because of the linkage train involved for transmitting motion from the operating shaft to the headlamp or other auxiliary equipment, canting movement is required. The structure is designed so that the elements are self-aligning. The entire force of the power unit is available to override the detent so that rigid positioning of the headlamp or headlamp covers is assured while permitting the force relied upon for moving the elements to readily overpower the holding force of the detent latch. In the instant embodiment, a holding force of ten to twenty pounds assures positive positioning.

While shown here by way of example in its simplest form, that is, latching in lamp operative position only, it is of course obvious that the detent latch may be utilized for holding the headlamp or headlamp covers rigid in both open and closed positions. Although the power actuator is described and illustrated by way of example for use in a retractable headlamp system, it will of course be understood that in accordance with the broader aspects of the invention, the power unit may be utilized to operate other and different auxiliary equipment.

The principal object of the present invention is to provide an improved pressure differential actuated power unit with a simplified internal positive holding mechanism to maintain the unit in one or more of its limit positions while permitting canting of the operating shaft either during movement from one position to another or in a latched position.

Another object of the invention is to provide an improved pressure differential actuated power unit for operating auxiliary equipment in automotive vehicles which includes a continuous acting fail-safe internal latching device for maintaining the equipment to be operated in one or more selected positions, the latching device being operative automatically without the use of auxiliary power mechanism.

Other objects and advantages of the invention will be apparent from the following detailed description taken in connection with the accompanying drawing.

Brief description of the drawing

FIG. 1 is a schematic diagram of the invention illustrating certain of the components partially in section.
FIG. 2 is a partial perspective view of one preferred embodiment of the invention partly in section.
FIG. 3 is a top elevational view of the detent assembly.
FIG. 4 is a view similar to FIG. 2 of another preferred embodiment of the invention.
FIG. 5 is a sectional view taken on line IV—IV of FIG. 3.

Description of the preferred embodiments

In FIG. 1 a power unit 10 is shown in a system for actuating a retractable headlamp 12. The system includes a manual control 14 which is a combined electric and pneumatic switching device similar to that illustrated in the above mentioned co-pending application Ser. No. 570,903. The system also includes a remote or servo valve 16. The remote valve 16 illustrated is a pneumatically actuated servo valve like that shown in application Ser. No. 566,520 by R. A. Deibel and W. C. Riester, filed July 20, 1966, and now abandoned. An electro pneumatic servo valve may be used in lieu of the pneumatic valve and may be of the type illustrated in application Ser. No. 566,521 by R. A. Deibel and W. C. Riester, filed July 20, 1966. It should be apparent that the headlamp may also be actuated directly by the manual control as shown in the system disclosed in above mentioned application Ser. No. 570,903.

Power unit 10 comprises a housing 20 formed of housing halves 20a and 20b. The housing halves 20a and 20b may be secured together in any suitable manner as, for example, welding or by crimping as illustrated. A diaphragm assembly 22 including a flexible diaphragm 24 divides the power unit into a pair of adjacent expansible chambers 26a and 26b. A port 28a is provided in communication with chamber 26a and a port 28b is provided in communication with chamber 26b. The flexible diaphragm 24 may have its periphery crimped or secured in any suitable manner at the junction between housing halves 20a and 20b. The diaphragm assembly 22 includes the flexible diaphragm 24 and a pair of dished plates 30a and 30b disposed centrally on opposite sides of the diaphragm 24 in back to back relationship. The plates are provided with aligned central apertures in alignment with the central aperture of the flexible diaphragm 24. The plates 30a and 30b may be of any suitable rigid material, preferably metal. An operating shaft or rod 32 is shouldered adjacent its end, as at 34, forming a reduced end portion which is snugly received through the aligned central apertures in the plates 30a, 30b and flexible diaphragm 24. The end of the operating shaft 32 is staked over, as at 36, to retain the operating rod in assembled condition with the diaphragm assembly 22. The shaft 32 extends through expansible chamber 26a and outwardly therefrom through a central aperture at the end wall of the housing half 20a. The central opening of the housing half 20a has disposed therein a grommet 38 which sealingly engages the shaft 32 to maintain the compartment 26a airtight.

In the embodiment illustrated in FIGS. 1 and 2, the operating rod 32 includes an annular groove 40 intermediate its end forming a pair of opposed shoulders for a purpose to be hereinafter described. In this embodiment, the end wall of housing half 20a is dished, as at 42, to form a central internal recess 44. Straddling or bridging the open end of the recess 44 is a detent assembly 46 including a detent retaining plate 48 which bridges the recess 44. The detent retaining plate 48 includes a peripheral rim 50 of substantially rectangular configuration having a dished-out shoulder 52 at each interior corner thereof and struck-up retaining tabs 54 at each end thereof intermediate a pair of adjacent shoulders 52. The detent plate may be formed of any suitable rigid material. A detent 56 is floatingly receievd between the shoulders 52 and the tabs 54 of the retaining plate 48. The detent may be of any suitable material such as, for example, spring steel. It is centrally struck up to form an arch 58, V-shaped in cross section, and a pair of flanges 60, one at each end. The legs of the V-shaped arch 58 have detent tabs 62 struck therefrom and formed to shape opposing detent elements which are engageable with the annular groove 40 between the shoulders thereof to provide latching means for retaining the operating shaft 32 in one of its limit positions. The arched portion 58 extends outwardly from the retaining plate 48 into the recessed or dished portion 44 of housing half 20a. The shaft 32 is slidably received between the opposing spring detent tabs 62 and is firmly latched when the detents 62 engage the annular recess 40. The flanges 60 of the detent 56 are received between the struck-up tabs 54 and a pair of depressed shoulders 52 with sufficient tolerance to permit the detent 56 to move in a plane parallel to the retaining plate 48 perpendicular to the axis of the shaft 32, but is retained against axial movement by the shoulders 52 and the tab 54. This floating arrangement permits the operating shaft or rod 32 to cant in any direction in either the latched or the unlatched position.

The manual switching device 14 is described in more detail in the above-mentioned application Ser. No. 566,520. It includes an electrical contact section 70 for controlling the lighting circuit and a pneumatic section 72 for controlling the fluid actuated power unit. The section 72 includes a valve housing 74 having an inlet port 76 and a pair of outlet ports 78 and 80. A slide valve 82 is movable in the housing 74 and connects the ports 76 and 80 when the switch is in the on position. It connects the ports 76 and 78 when the switch is in the off position. The manual operator 84 is reciprocal and simultaneously moves the electrical contactor and the slide valve 82.

The servo valve 16, described in more detail in the above-mentioned application Ser. No. 566,520, includes a chamber 90 divided by a diaphragm, not shown, into an upper expansible chamber 90a and a lower expansible chamber 90b. Chambers 90a and 90b include ports 92a and 92b, respectively, communicating therewith. Secured to and movable with the diaphragm is a slide valve retainer 94 for operating a slide valve 96 within a slide valve housing 98. The housing 98 includes an inlet port 100 and outlet ports 102 and 104. In its lowermost position, as viewed in FIG. 1, the slide valve 96 effects communication between ports 100 and 104 and in its opposite extreme position, slide valve 96 connects ports 100 and 102.

The headlamp 12 is diagrammatically illustrated and includes a lever 110 connected to operating shaft 32 of power unit 10. A lever is secured to a headlight housing 112 in which is mounted a headlight 114. The headlamp unit 12 is shown in the operative condition. When the diaphragm of the power unit 10 moves to the opposite extreme position from that shown in FIG. 1, the headlamp is fully retracted. It will of course be understood that a headlamp shield may be utilized with a stationary headlight in accordance with the broader aspects of this invention.

The headlight actuating system shown is united by a network of conduits. A fluid conduit 120 effects communication between a vacuum source, not shown, and port 76 of valve housing 74 through a conduit 122. Communication between the vacuum source and port 100 of servo valve 16 is effected through conduit 120 and a conduit 124. A conduit 126 connects outlet port 78 of manual switch valve housing 74 with port 92a of the remote or servo valve 16. A conduit 128 connects outlet port 80 of manual switch valve housing 74 with port 92b of servo valve 16. A conduit 130 connects port 104 of servo valve 16 with port 28a of power unit 10 and a conduit 132 connects outlet port 102 of servo valve 16 with port 28b of power unit 10.

The operation of the device should now be apparent. When the shaft of the manual switch 14 is moved to the right as seen in FIG. 1 to the position there shown, contact is made in the electrical circuit through the electrical contactor 70. Simultaneously, the slide valve 82 is moved to a position connecting ports 76 and 80. Vacuum is drawn through conduit 120, conduit 122, port 76, slide valve element 82, port 80, conduit 128 and port 92b of pneumatic chamber 90b, thereby drawing the diaphragm in pneumatic chamber 90 downwardly, causing slide valve 96 to effect communication between ports 100 and 104 of servo valve 16. Vacuum is then admitted to chamber 26a of power unit 10 from the vacuum source through conduits 120 and 124, port 100, slide valve 96, port 104 and conduit 130 to port 28a of power unit 10. The diaphragm assembly 22 together with the operating rod 32 are drawn to the position shown in FIG. 1 and retained in that position by the engagement of the detent tabs 62 with the annular recess 40 on the operating shaft 32. This movement places the headlamp assembly 12 in an operating position with the headlamps exposed and rigidly retains it in this position until actuated to retracted position.

When it is desired to move the headlamps to inoperative position, the shaft of the manual switch 14 is pushed inwardly or to the left from the position as illustrated in FIG. 1. This opens the lighting circuit and simultaneously moves the valve 82 to a position which effects communication between ports 76 and 78. A vacuum is then drawn in chamber 90a of pneumatic compartment 90 in servo valve 16 through conduit 120, conduit 122, port 76, valve 82, port 78 and conduit 126. The diaphragm in the pneumatic chamber 90 of servo valve 16 is drawn upwardly, as viewed in FIG. 1, drawing the slide valve assembly 94 to a position where communication is established between port 100 and port 102. This permits vacuum to flow from the source to the chamber 26a of the fluid pressure actuator 10. The vacuum is drawn from the source through conduits 120 and 124, port 100, valve 96, port 102 and conduit 132 through port 28b to chamber 26b. The vacuum pressure in chamber 26b is sufficient to draw the diaphragm assembly 22 downwardly from the position illustrated in FIG. 1 against the force of the spring detent tabs 62. This in turn moves the operating rod 32 and thereby moves the headlamp assembly to the retracted position. It will of course be understood that in lieu of moving the complete headlight assembly a headlamp lid or shield may be moved by the actuator 10 from a closed position to an open position and vice versa.

Another embodiment of the invention is illustrated in FIGS. 4 and 5. In the FIG. 4 embodiment, the end wall of the housing half 220a is substantially flat and a pair of posts 221 project axially inwardly from the end wall of the housing half 220a and are diametrically spaced on opposite sides of the shaft 232. The posts 221 include a reduced diameter portion 223 at their free ends, as clearly illustrated in FIG. 5, forming a shoulder 225. The flanges 260 of the detent 246 are apertured as at 227 to receive the reduced end portion 223 of the posts 221. The flanges 260 are supported on the shoulder 225 of the posts 221. A washer 229 is provided at the free end of the posts 221 and the posts are peened over as at 231 to retain the detent element 246 thereon. The openings 227 have sufficient clearance to be movable a substantial distance to provide a floating mounting of the detent as in the FIG. 1 and 2 embodiments. In lieu of the annular recess 40 as in the FIG. 1 embodiment for engagement with the detent tabs, the FIG. 4 embodiment includes a pair of diametrically disposed protrusions or shoulders 240 on the shaft 232 for engagement with the detent tabs 262. The FIG. 4 embodiment provides a floating mount for the detent assembly 246 to allow canting of the operating shaft 32 in either the latched or unlatched position.

Thus it can be seen that a unique pressure differential actuated power unit has been provided wtih simplified internal positive latching mechanism to maintain the unit in one or more of its limit positions while permitting canting of the operating shaft at any position or during movement from one position to another. Although certain specific embodiments of the invention have been shown and described for the purpose of illustration for use in a specific retractable headlamp system, it will of course be apparent that in accordance with the broader aspects of the invention, the novel power unit may be utilized in other and different retractable headlamp shield systems as well as retractable headlamp sets or for other and different movable auxiliary equipment in motor vehicles. It will be apparent that various modifications and other embodiments are possible within the scope of the invention. It is to be understood, therefore, that the invention is not limited to the specific arrangement shown, but in its broadest aspects, it includes all equivalent embodiments and modifications which come within the scope of the invention.

What is claimed is:

1. A fluid pressure power unit comprising a housing, a movable wall assembly disposed within said housing forming with said housing adjacent expansible chambers on opposite sides thereof, said wall being movable in response to application of a pressure differential thereacross, porting means for effecting communication between a fluid pressure source and said housing to thereby selectively provide a fluid pressure differential across said movable wall, a shaft coupled to said movable wall, said housing having an aperture at an end wall, resilient means circumscribing said aperture for receiving said shaft therethrough in sliding, sealing engagement, said shaft being capable of canting relative to said housing, a shoulder on said shaft, a latch assembly mounted at an end wall of said housing, means mounting said latch assembly for floating movement, said latch assembly including detent means slidably receiving said shaft and engageable with said shoulder to thereby latch said shaft whereby said shaft can cant universally in latched and unlatched positions, said wall assembly, detent means, and resilient means being the sole support of said shaft in said power unit.

2. A fluid pressure power unit according to claim 1 wherein said latch assembly is located internally of said housing.

3. A fluid pressure power unit according to claim 1 wherein said detent means comprises a plurality of opposed spring detent tabs receiving said shaft therebetween.

4. A fluid pressure power unit according to claim 1 wherein said shaft has an annular groove forming said shoulder, said housing including an internal recess in an end wall thereof, said latch assembly includes a detent retaining plate bridging said recess, said detent means being mounted on said retaining plate for universal floating movement and extending into said recess, said detent means comprising a plurality of opposed spring detent tabs embracing said shaft.

5. A fluid pressure power unit according to claim 1 wherein said housing includes a plurality of posts projecting axially inwardly from an end wall of said housing, said detent assembly being floatingly mounted on said posts for limited movement to thereby permit canting of said shaft in latched and unlatched positions.

References Cited

UNITED STATES PATENTS

| | | |
|---|---|---|
| 834,082 | 10/1906 | Smith. |
| 983,610 | 2/1911 | Dooley _____ 74—527 X |
| 2,081,239 | 5/1937 | Klopfenstein _____ 92—30 X |
| 2,574,314 | 11/1951 | Arden _____ 74—527 X |
| 2,630,787 | 3/1953 | Verch _____ 92—30 |
| 2,695,023 | 11/1954 | Brown _____ 74—527 X |
| 3,186,252 | 1/1965 | Olandt _____ 74—527 X |

FOREIGN PATENTS 1,112,668  11/1955  France.

MARTIN P. SCHWADRON, *Primary Examiner.*

IRWIN C. COHEN, *Assistant Examiner.*

U.S. Cl. X.R.

74—527; 92—100, 167